(12) United States Patent
Hattori et al.

(10) Patent No.: US 11,426,876 B2
(45) Date of Patent: Aug. 30, 2022

(54) INFORMATION PROCESSING APPARATUS, INFORMATION PROCESSING METHOD, AND PROGRAM

(71) Applicant: OMRON Corporation, Kyoto (JP)

(72) Inventors: Kosuke Hattori, Kyoto (JP); Yoshinori Konishi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 677 days.

(21) Appl. No.: 16/358,746

(22) Filed: Mar. 20, 2019

(65) Prior Publication Data

US 2019/0308324 A1 Oct. 10, 2019

(30) Foreign Application Priority Data

Apr. 5, 2018 (JP) .............................. JP2018-073255

(51) Int. Cl.
*B25J 9/16* (2006.01)
*G06T 7/73* (2017.01)
(Continued)

(52) U.S. Cl.
CPC ........... *B25J 9/1697* (2013.01); *G01B 11/005* (2013.01); *G01B 11/24* (2013.01); *G06T 1/0014* (2013.01);
(Continued)

(58) Field of Classification Search
USPC ................................................ 700/245–264
See application file for complete search history.

(56) References Cited

U.S. PATENT DOCUMENTS 7,310,889 B2 * 12/2007 Stamenkovic ......... G01B 21/04
33/503
7,532,949 B2 * 5/2009 Ban ...................... G01B 21/042
345/419
(Continued)

FOREIGN PATENT DOCUMENTS

CN 104154877 A 11/2014
CN 104634276 A 5/2015
(Continued)

OTHER PUBLICATIONS

Extended European search report dated Jul. 10, 2019 in a counterpart European patent application.
(Continued)

*Primary Examiner* — Jonathan L Sample
(74) *Attorney, Agent, or Firm* — Metrolex IP Law Group, PLLC

(57) ABSTRACT

An information processing apparatus includes: a determination unit configured to determine a plurality of measurement positions and/or orientations from which a 3D measurement sensor makes three-dimensional measurements; a controller configured to successively move the 3D measurement sensor to the plurality of measurement positions and/or orientations; a measurement unit configured to generate a plurality of 3D measurement data sets through three-dimensional measurement using the 3D measurement sensor at each of the plurality of measurement positions and/or orientations; and a data integration unit configured to integrate the plurality of 3D measurement data sets.

20 Claims, 7 Drawing Sheets

(51) Int. Cl.
  *G06T 1/00* (2006.01)
  *G01B 11/24* (2006.01)
  *G06T 7/521* (2017.01)
  *G01B 11/00* (2006.01)

(52) U.S. Cl.
  CPC ............... *G06T 7/521* (2017.01); *G06T 7/73* (2017.01); *B25J 9/1692* (2013.01); *G01B 2210/52* (2013.01); *G06T 2207/10016* (2013.01); *G06T 2207/30164* (2013.01)

(56) References Cited

U.S. PATENT DOCUMENTS

| | | | | |
|---|---|---|---|---|
| 7,957,583 | B2* | 6/2011 | Boca | G06T 7/75 |
| | | | | 382/154 |
| 7,996,110 | B2* | 8/2011 | Lipow | A61B 34/76 |
| | | | | 318/568.11 |
| 8,244,402 | B2* | 8/2012 | Wells | G06T 7/246 |
| | | | | 318/568.13 |
| 8,559,699 | B2* | 10/2013 | Boca | B25J 9/1697 |
| | | | | 382/153 |
| 8,605,983 | B2* | 12/2013 | Weston | G01B 11/026 |
| | | | | 382/141 |
| 9,188,973 | B2* | 11/2015 | Tenney | H04N 7/181 |
| 9,211,643 | B1* | 12/2015 | Shirakyan | B25J 9/1674 |
| 9,327,406 | B1* | 5/2016 | Hinterstoisser | B25J 9/1697 |
| 10,766,136 | B1* | 9/2020 | Porter | G06N 3/04 |
| 10,812,778 | B1* | 10/2020 | Wang | G01B 11/0608 |
| 2004/0172164 | A1* | 9/2004 | Habibi | G06T 1/0007 |
| | | | | 700/245 |
| 2013/0100282 | A1* | 4/2013 | Siercks | G01B 11/25 |
| | | | | 348/135 |
| 2014/0229005 | A1* | 8/2014 | Suzuki | B25J 9/1692 |
| | | | | 700/254 |
| 2014/0327746 | A1* | 11/2014 | Dubois | G06T 17/00 |
| | | | | 348/50 |
| 2015/0009214 | A1* | 1/2015 | Lee | G06T 17/10 |
| | | | | 345/420 |
| 2015/0127153 | A1* | 5/2015 | Yamaguchi | B25J 9/1697 |
| | | | | 700/254 |
| 2015/0170365 | A1* | 6/2015 | Liu | G06T 7/80 |
| | | | | 382/103 |
| 2015/0283704 | A1* | 10/2015 | Watanabe | B25J 9/1612 |
| | | | | 700/262 |
| 2016/0039094 | A1* | 2/2016 | Lundberg | B25J 9/1692 |
| | | | | 700/251 |
| 2016/0059419 | A1* | 3/2016 | Suzuki | B25J 9/1692 |
| | | | | 901/14 |
| 2016/0084642 | A1* | 3/2016 | Bradski | G06V 10/242 |
| | | | | 348/136 |
| 2016/0239725 | A1* | 8/2016 | Liu | G06T 5/00 |
| 2016/0379370 | A1* | 12/2016 | Nakazato | G06T 7/50 |
| | | | | 382/103 |
| 2017/0136626 | A1* | 5/2017 | Wang | B25J 9/1692 |
| 2017/0177746 | A1* | 6/2017 | Gotou | B25J 9/1697 |
| 2017/0251143 | A1* | 8/2017 | Peruch | H04N 5/23293 |
| 2017/0358048 | A1* | 12/2017 | Kotake | G06T 1/0007 |
| 2018/0222056 | A1* | 8/2018 | Suzuki | B25J 9/0096 |
| 2019/0308324 | A1* | 10/2019 | Hattori | G06T 1/0014 |

FOREIGN PATENT DOCUMENTS

| | | |
|---|---|---|
| CN | 105225269 A | 1/2016 |
| CN | 107121062 A | 9/2017 |
| JP | H8-254424 A | 10/1996 |
| JP | 5633058 B1 | 10/2014 |
| JP | 2017-10327 A | 1/2017 |
| JP | 2017-111019 A | 6/2017 |
| JP | 2019-514240 A | 5/2019 |

OTHER PUBLICATIONS

Office Action (JPOA) dated Feb. 24, 2021 in a counterpart Japanese patent application.
Office Action (CNOA) dated Dec. 30, 2021 in a counterpart Chinese patent application.
Zhou Baoxing, "3D Laser Scanning Technology and Its Application in Deformation Monitoring", Shandong University Press, Jan. 2018, pp. 26-28, China ; Relevance is indicated in the (translated) CNOA dated Apr. 13, 2022.
Office Action (CNOA) dated Apr. 13, 2022 in a counterpart Chinese patent application.

* cited by examiner

INFORMATION PROCESSING APPARATUS, INFORMATION PROCESSING METHOD, AND PROGRAM

CROSS-REFERENCES TO RELATED APPLICATIONS

This application claims priority to Japanese Patent Application No. 2018-073255 filed Apr. 5, 2018, the entire contents of which are incorporated herein by reference.

FIELD

The disclosure relates to an information processing apparatus, an information processing method, and a program.

BACKGROUND

In recent years, industrial robots have spread which are configured to capture an object using a 3D sensor or the like, determine a position of a workpiece according to the results obtained by capturing the object, and then e.g. hold or assemble this object using arms. A 3D sensor usually measures the distance from the 3D sensor to the surface of an object using reflected light that is reflected by the surface of the object. However, if an object is made of metal, for example, specular reflection occurs on the surface, and thus it is difficult to obtain suitable reflected light. Also, a dead angle at which it is difficult to obtain reflected light sometimes occurs depending on the shape of an object. As a result, it is difficult to make 3D measurement of workpieces causing specular reflection or objects with a complicated shape, for example, and in the case of such objects, a portion of a range detected by a 3D sensor tends to include a region where 3D measurement is not possible.

Herein, Japanese Patent 5633058 discloses a three-dimensional measurement apparatus configured to make 3D measurement using a projector and three or more image capturing means at a plurality of positions, for example. With this three-dimensional measurement apparatus, three-dimensional measurement is made by integrating 3D measurement results obtained through image capture at a plurality of positions in a predetermined coordinate system.

Japanese Patent 5633058 is an example of background art.

SUMMARY

However, with the method disclosed in Japanese Patent 5633058, because the positions of the image capturing means are fixed, regions where 3D measurement cannot be made due to a dead angle or specular reflection still remain in some cases depending on the shape of an object or workpiece, for example. Also, because a plurality of image capturing apparatuses are used, it is necessary to calibrate these image capturing apparatuses and control image capturing timings at which these image capturing apparatuses capture images, and thus the configurations of the apparatuses are complicated.

One or more aspects have been made in view of the above-described issues, and one or more aspects may provide an information processing apparatus, an information processing method, and a program that enable suitable three-dimensional measurement with few unmeasured regions resulting from dead angles, specular reflections, and the like.

An information processing apparatus according to one or more aspects includes a determination unit configured to determine a plurality of measurement positions and/or orientations from which a 3D measurement sensor makes three-dimensional measurements, a controller configured to successively move the 3D measurement sensor to the plurality of measurement positions and/or orientations, a measurement unit configured to generate a plurality of 3D measurement data sets through three-dimensional measurement using the 3D measurement sensor at each of the plurality of measurement positions and/or orientations, and a data integration unit configured to integrate the plurality of 3D measurement data sets.

With this configuration, even if three-dimensional measurement of a measurement object fails from a specific measurement position due to a dead angle or an influence of specular reflection, for example, if three-dimensional measurements are made from different measurement positions, it is possible to narrow a region missing in 3D measurement data sets by integrating their results.

In the above-described configuration, the data integration unit may also be configured to, if a three-dimensional measurement is possible from a second measurement position and/or orientation that is different from a first measurement position and/or orientation out of the plurality of measurement positions and/or orientations, for a missing region where three-dimensional measurement is not possible from the first measurement position and/or orientation, apply the 3D measurement data set measured from the second measurement position and/or orientation to the missing region.

This configuration makes it possible to narrow a missing region in the first 3D measurement data set by complementing the missing region with the second 3D measurement data set.

In the above-described configuration, the data integration unit may also be configured to apply a measurement result obtained from the measurement position and/or orientation having a shorter distance from a measurement object to a region where a three-dimensional measurement is possible from the first measurement position and/or orientation and the second measurement position and/or orientation.

In three-dimensional measurement, measurement made from a close position is usually more accurate, and thus this configuration makes it possible to increase accuracy in a 3D measurement data set, which is the result of integration, by applying the result of three-dimensional measurement obtained from a close position.

In the above-described configuration, a configuration may also be adopted in which integration of the plurality of 3D measurement data sets by the data integration unit and movement of the 3D measurement sensor by the controller are performed in parallel to each other.

This configuration makes it possible to reduce the overall processing time period by performing integration of the 3D measurement data sets and movement of the 3D measurement sensor in parallel to each other.

In the above-described configuration, the controller may also be configured to move the 3D measurement sensor using a robot hand of a robot.

This configuration makes it possible to move the 3D measurement sensor using a robot hand performing a holding operation and the like. As a result, it is not necessary to provide a mechanism for moving the 3D measurement sensor separately from the robot hand performing operations, and it is possible to make 3D measurement from a position of the robot hand performing operations.

In the above-described configuration, the controller may also be configured to perform hand-eye calibration on the 3D measurement sensor attached to the robot hand.

This configuration makes it possible to perform accurate positioning in integration of a plurality of 3D measurement data sets.

In the above-described configuration, the data integration unit may also be configured to convert the plurality of 3D measurement data sets such that the plurality of 3D measurement data sets have the same coordinate system by calculating relative positions and relative rotation angles between the plurality of measurement positions and/or orientations, and to integrate the plurality of converted 3D measurement data sets.

In particular, if the 3D measurement sensor is moved using a robot hand, measurement positions and/or orientations can be often acquired from an encoder of the robot including the robot hand, and thus this configuration makes it possible to easily and suitably integrate 3D measurement data sets using them.

In an information processing method according to one or more aspects, an information processing apparatus performs processing for determining a plurality of measurement positions and/or orientations from which a 3D measurement sensor makes three-dimensional measurements, processing for successively moving the 3D measurement sensor to the plurality of measurement positions and/or orientations, processing for generating a plurality of 3D measurement data sets through three-dimensional measurement using the 3D measurement sensor at each of the plurality of measurement positions and/or orientations, and processing for integrating the plurality of 3D measurement data sets.

With this configuration, even if three-dimensional measurement of a measurement object fails from a specific measurement position due to a dead angle or an influence of specular reflection, for example, if three-dimensional measurements are made from different measurement positions, it is possible to narrow a missing region in the 3D measurement data sets by integrating the results.

A program according to one or more aspects causes an information processing apparatus to execute processing for determining a plurality of measurement positions and/or orientations from which a 3D measurement sensor makes three-dimensional measurements, processing for successively moving the 3D measurement sensor to the plurality of measurement positions and/or orientations, processing for generating a plurality of 3D measurement data sets through three-dimensional measurement using the 3D measurement sensor at each of the plurality of measurement positions and/or orientations, and processing for integrating the plurality of 3D measurement data sets.

With this configuration, even if three-dimensional measurement of a measurement object fails from a specific measurement position due to a dead angle or an influence of specular reflection, for example, if three-dimensional measurements are made from different measurement positions, it is possible to narrow a missing region in the 3D measurement data sets by integrating the results.

Note that in the disclosure, "unit", "means", "apparatus", and "system" do not simply mean physical means but also include the case where functions of the "unit", "means", "apparatus", and "system" are realized by software. Also, functions of one "unit", one "means", one "apparatus", and one "system" may also be realized by two or more physical means or apparatuses, or functions of two or more "units", "means", "apparatuses", and "systems" may also be realized by one physical means or apparatus.

DETAILED DESCRIPTION

Figure 1A:
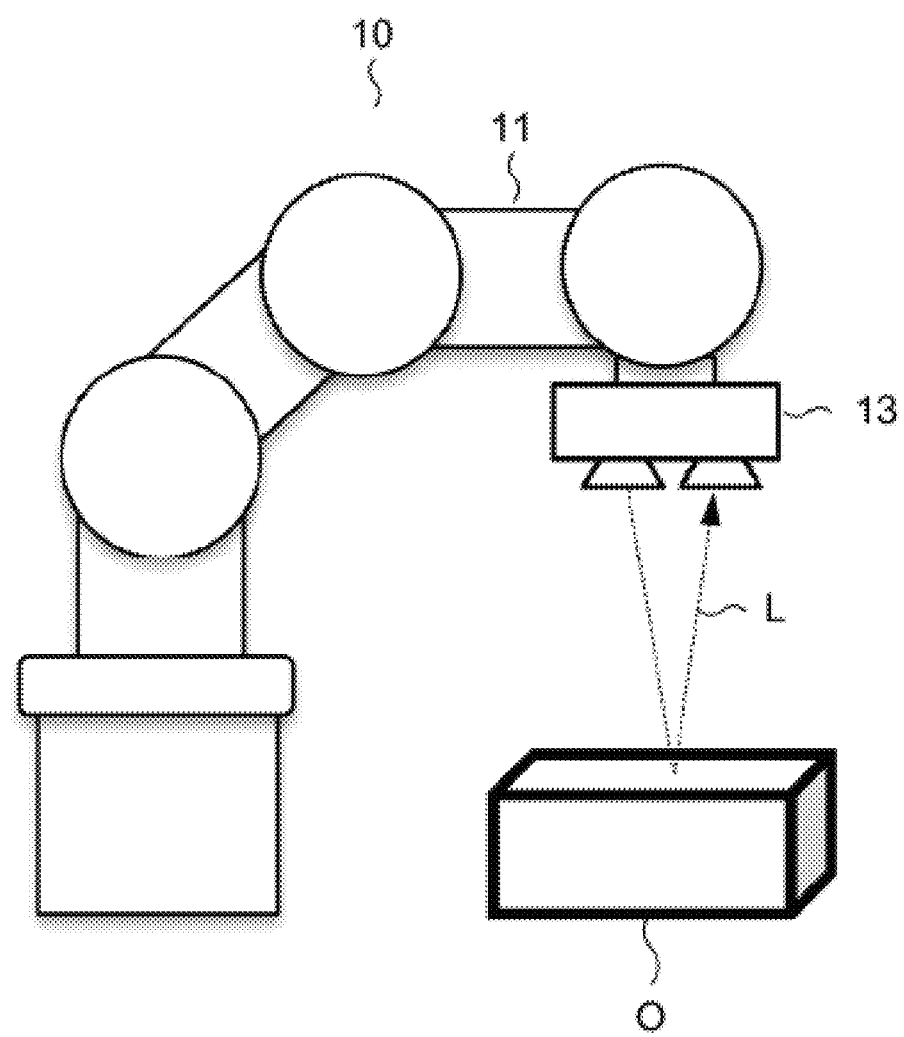
FIG. 1A is a diagram illustrating one example of processing of a 3D position detection system according to an embodiment.

Hereinafter, an embodiment will be described with reference to the drawings. However, an embodiment that will be described below is merely an example, and it is not intended to exclude various modifications and application of techniques that are not explicitly described below. That is, an embodiment can be implemented with various modifications without departing from its spirit. Also, the same or similar portions are given the same or similar reference numerals in the drawings below. The drawings are schematic, and their sizes and ratios do not coincide with the actual sizes and ratios, for example. Drawings may sometimes include portions with different dimensional relationships and different ratios.

1. Application Examples

An overview according to an embodiment will be described with reference to FIGS. 1A and 1B. An information processing apparatus according to an embodiment is for measuring a three-dimensional position of an object O using a 3D measurement sensor 13 attached to a leading end of an industrial robot 10 having a robot hand 11, for example.

The 3D measurement sensor 13 measures the distance to a surface of the object O by detecting light L reflected from a surface of the object O. As a result of making this measurement over a certain range, it is possible to measure three-dimensional coordinates of the surface of the object O. Although the 3D measurement sensor 13 irradiates the object O with light in the examples shown in FIGS. 1A and 1B, an embodiment is not limited thereto, and the distance to the surface of the object O may also be measured by detecting, using the 3D measurement sensor 13, reflected light L of light emitted from a light source other than the 3D measurement sensor 13. Note that various sensors such as a stereo camera, a TOF (time of flight) sensor, and a phase shift sensor may be used for the 3D measurement sensor 13, and any three-dimensional measurement method may be used by the 3D measurement sensor 13.

However, if the object O is made of metal, for example, as a result of specular reflection occurring on the surface of the object O, suitable reflected light L is not easily obtained.

Also, a dead angle at which some of the reflected light L is not easily obtained may be formed depending on the shape of the object O. It is not possible to measure a three-dimensional position in a region where suitable reflected light L is not obtained. Hereinafter, a region whose three-dimensional position is not measured due to a dead angle or an influence of specular reflection, for example, is also referred to as an "unmeasured region" or "missing region".

Figure 1B:
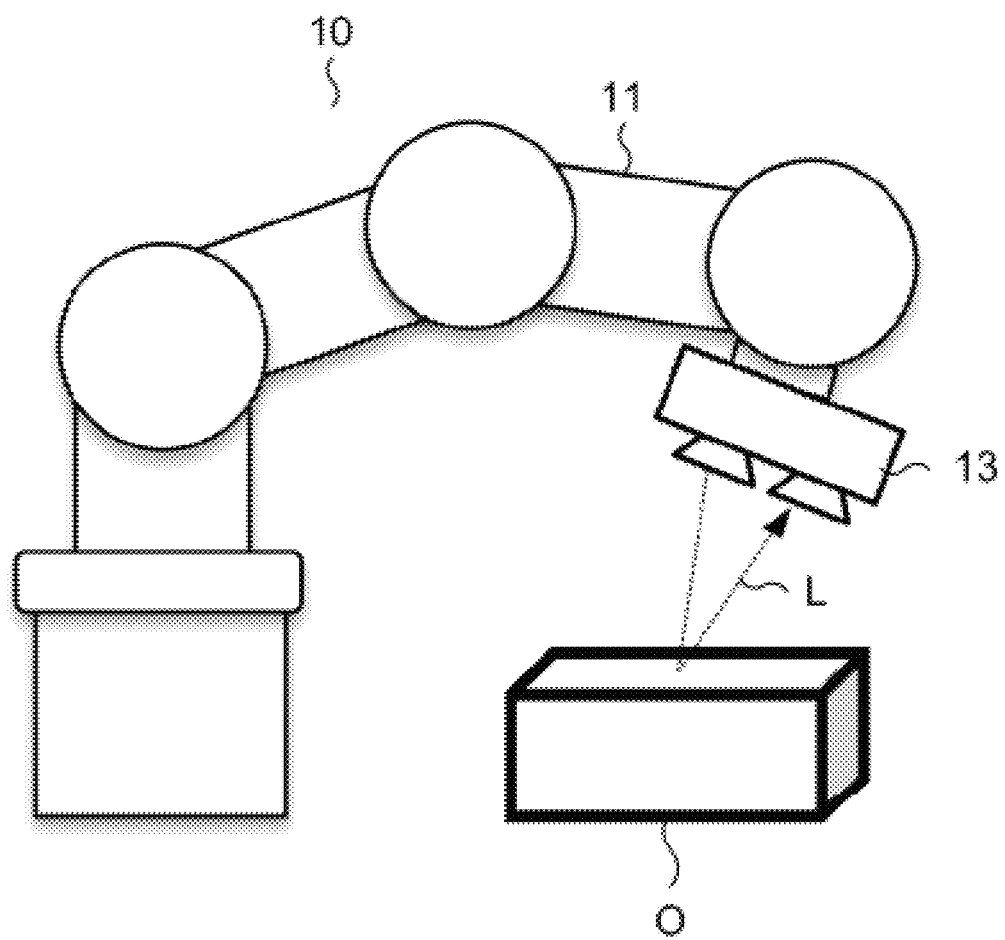
FIG. 1B is a diagram illustrating one example of processing of a 3D position detection system according to an embodiment.

As shown in FIGS. 1A and 1B, the 3D position detection system according to this embodiment changes the position and the orientation of the 3D measurement sensor 13 using the robot hand 11, and measures the three-dimensional position of the object O from a plurality of positions and orientations. For example, even if there is a region where the three-dimensional position of the object O is not measured from the position of the 3D measurement sensor 13 shown in FIG. 1A, if the three-dimensional position of the object O can be measured from the position and the orientation of the 3D measurement sensor 13 shown in FIG. 1B, the unmeasured region can be narrowed by integrating the results. In this manner, as a result of integrating the three-dimensional positions measured from a plurality of positions and orientations, it is possible to further increase accuracy in three-dimensional position measurement compared to that of a three-dimensional position measurement made only from one position and orientation, while narrowing an unmeasured region resulting from dead angles or specular reflections, for example.

Although the position and the orientation of the 3D measurement sensor 13 are changed by driving the robot hand 11 of the industrial robot 10 in the description below, a method for moving the position and the orientation of the 3D measurement sensor 13 is not limited to using the robot hand 11. For example, it is also conceivable that the 3D measurement sensor 13 is provided movably on a rail, or the 3D measurement sensor 13 is attached to a vehicle-type mobile robot or a drone.

Also, although a case where both the position and the orientation of the 3D measurement sensor 13 are changed will be described below as an example, an embodiment is not limited thereto, and it is also possible that only one of the position and the orientation is changed.

2. Configuration Example

Figure 2:
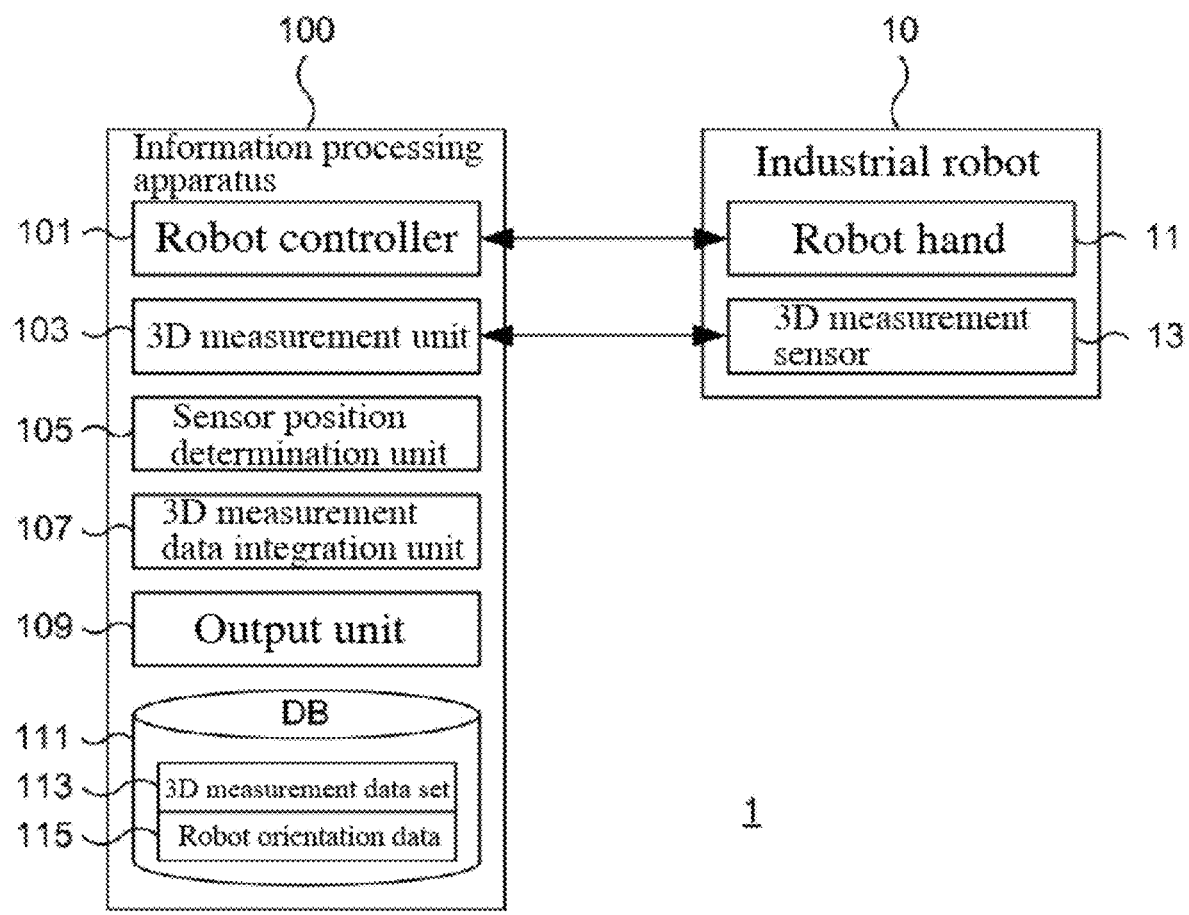
FIG. 2 is a schematic diagram illustrating one example of a configuration of a 3D position detection system according to an embodiment.

A configuration example of operations of a 3D position detection system 1 according to an embodiment will be described with reference to FIG. 2. The 3D position detection system 1 according to an embodiment mainly includes the industrial robot 10 and an information processing apparatus 100. Note that the information processing apparatus 100 and the industrial robot 10 are not necessarily realized as physically different apparatuses, and the industrial robot 10 and the information processing apparatus 100 may also be realized as one apparatus.

2.1 Industrial Robot 10

The industrial robot 10 includes the robot hand 11 and the 3D measurement sensor 13. The robot hand 11 is a mechanism for changing the three-dimensional position and orientation of the 3D measurement sensor 13 under the control of a robot controller 101 of the information processing apparatus 100. The robot hand 11 may also be provided with a mechanism for performing optional operations on the object O.

The 3D measurement sensor 13 is a mechanism for irradiating the object O with light under the control of a 3D measurement unit 103 of the information processing apparatus 100, and measuring the distance to the surface of the object O by detecting its reflected light.

2.2 Information Processing Apparatus 100

The information processing apparatus 100 includes a robot controller 101, a 3D measurement unit 103, a sensor position determination unit 105, a 3D measurement data integration unit 107, an output unit 109, and a database (DB) 111.

The robot controller 101 moves the robot hand 11 by transmitting and receiving various control signals to/from the robot hand 11 of the industrial robot 10. In particular, the robot controller 101 controls the robot hand 11 such that the 3D measurement sensor 13 is located at a position and in an orientation that are determined by the sensor position determination unit 105, which will be described later. Accordingly, the robot hand 11 can change the three-dimensional position of the 3D measurement sensor 13. Note that the robot controller 101 acquires, as robot orientation data 115, orientation information regarding the robot hand 11 obtained when the 3D measurement sensor 13 has made a measurement, from an encoder of the industrial robot 10, and stores the acquired orientation information in the DB 111. The robot orientation data 115 acquired by the robot controller 101 from the encoder of the industrial robot 10 may include information regarding a relative rotation angle R and a relative position t of the robot hand 11 with respect to a position at which a base of the robot is installed. The robot controller 101 is one example of a "controller" according to an embodiment.

The 3D measurement unit 103 measures the three-dimensional position of the surface of the object O by transmitting and receiving various control signals to/from the 3D measurement sensor 13 of the industrial robot 10. If the three-dimensional position is measured from a plurality of positions and orientations that have been determined by the sensor position determination unit 105, then the 3D measurement unit 103 should measure the three-dimensional position after the 3D measurement sensor 13 has moved to those positions and orientations under the control of the robot controller 101. The results obtained by measuring the three-dimensional positions are stored in the DB 111 as 3D measurement data sets 113. Note that, in order to increase an accuracy in measurement of the three-dimensional positions, the 3D measurement unit 103 may also perform hand-eye calibration before a three-dimensional position is measured. The 3D measurement unit 103 is an example of a "measurement unit" according to an embodiment.

The sensor position determination unit 105 determines a plurality of positions and orientations of the 3D measurement sensor 13 for the 3D measurement sensor 13 to measure three-dimensional positions of the surface of the object O. Although any method can be used as a method for determining positions and orientations of the 3D measurement sensor from which measurement is made, for example, it is possible that measurement positions and orientations are determined by making the 3D measurement sensor 13 face the object O while moving the 3D measurement sensor 13 by a certain angle (e.g., 15 degrees) at a time on the same circular arc or the same spherical surface, or the measurement positions and orientations are determined by moving the 3D measurement sensor 13 at random. Alternatively, it is also possible that the sensor position determination unit 105 is configured to determine positions and orientations of the 3D measurement sensor 13 such that dead angles in the range in which the three-dimensional position is measured are reduced as much as possible. The sensor position determination unit 105 is one example of a "determination unit" according to an embodiment.

The 3D measurement data integration unit 107 performs processing for integrating the 3D measurement data sets 113, which are the 3D measurement results obtained through measurement from a plurality of positions and orientations. In the integration processing, the 3D measurement data integration unit 107 may first convert, using the robot orientation data 115, the 3D measurement data sets 113 such that the 3D measurement data sets 113 have the same coordinate system, and then integrate the converted 3D measurement data sets 113. More specifically, the 3D measurement data integration unit 107 calculates, using the robot orientation data 115, relative rotation angles and relative positions between positions and between orientations of the 3D measurement sensor 13 when the 3D measurement data sets 113 are generated. Then, the 3D measurement data integration unit 107 converts the 3D measurement data sets 113 such that the 3D measurement data sets 113 have the same coordinate system, and integrates the converted 3D measurement data sets 113. Although various integrations methods are possible, for example, with regard to a region whose three-dimensional position could not be measured from a first position/orientation (position and orientation) and whose three-dimensional position could be measured from second position/orientation, the 3D measurement data integration unit 107 should apply the latter to determine the three-dimensional position. Also, if the three-dimensional positions can be measured from the first position/orientation and the second position/orientation, it is possible to apply the result of measurement of the three-dimensional position measured from that position, out of the first position/orientation and the second position/orientation, that has a shorter straight distance from the position to be measured on the surface of the object. More specifically, for example, if a 3D measurement data set 113 measured from the first position and a 3D measurement data set 113 measured from the second position have the same (x, y) coordinates, then the 3D measurement data set 113 with the smaller Z-coordinate value should be adopted.

Alternatively, it is also possible that the 3D measurement data integration unit 107 integrates the 3D measurement data sets 113 using an algorithm such as a TSDF (Truncated Signed Distance Function). Also, at this time, the three-dimensional positions of an unmeasured region may be complemented using information regarding the surrounding three-dimensional positions. A specific example of a flow of processing performed by the 3D measurement data integration unit 107 will be described later with reference to FIG. 4. The 3D measurement data integration unit 107 is an example of a "data integration unit" according to an embodiment.

The output unit 109 outputs the 3D measurement data set 113 integrated by the 3D measurement data integration unit 107 to the outside. Although it is possible that the 3D measurement data sets are to be output to various portions, for example, in order to hold the object O, the 3D measurement data sets 113 are output from the output unit 109 to a control module for controlling the industrial robot 10. Note that the control module may be a software module or a hardware module.

The DB (database) 111 stores and manages 3D measurement data sets 113 indicating the positions of the surface of the object O measured from each position and robot orientation data 115 indicating orientation information regarding the robot hand 11 at the respective positions. The 3D measurement data set 113 may include information on three-dimensional coordinates in a measurement range. Also, the robot orientation data 115 may include information regarding the coordinates and the rotation angles of the 3D measurement sensor 13.

3. Flow of Processing

Figure 3:
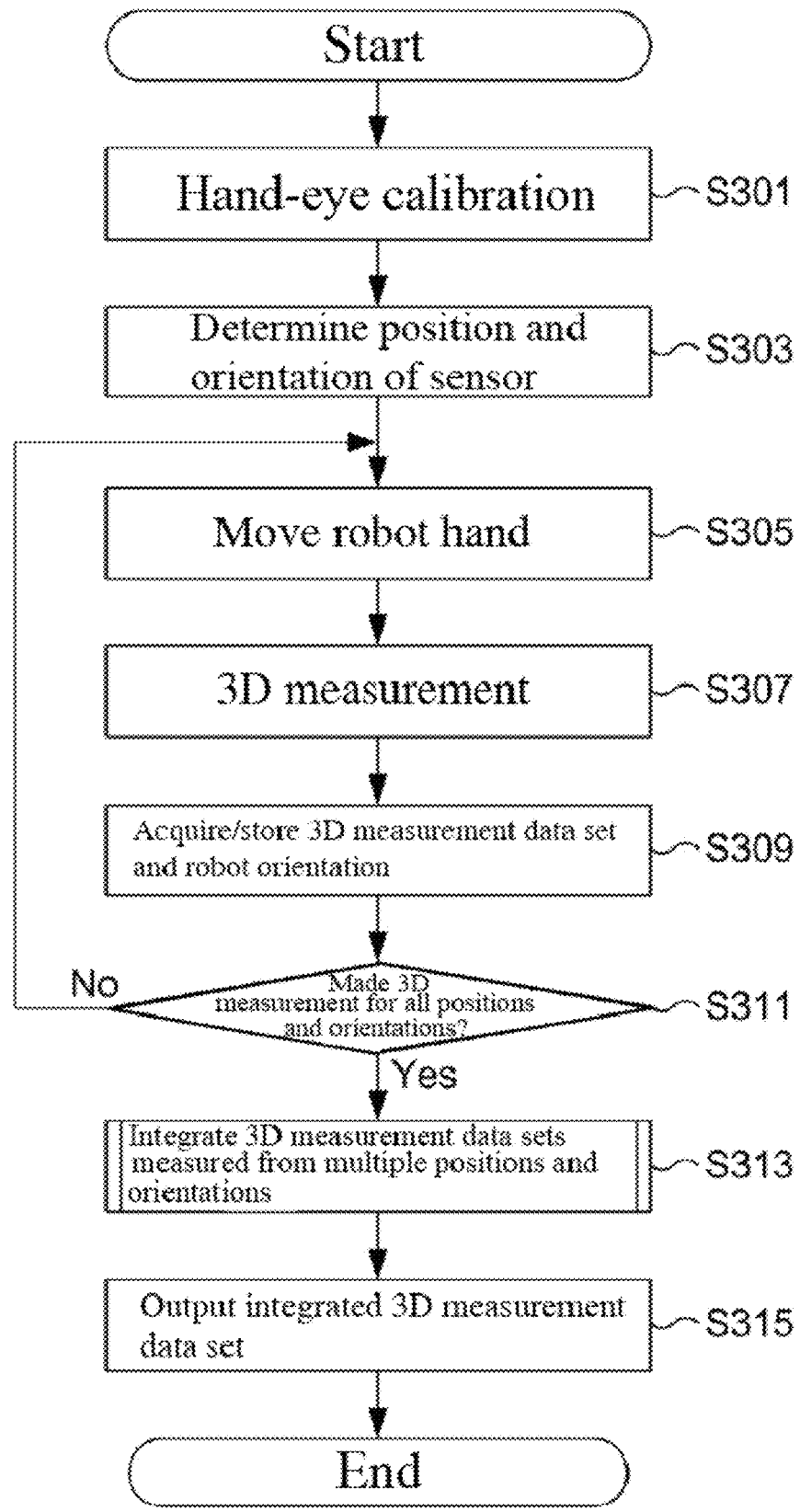
FIG. 3 is a flow diagram illustrating one example of a procedure performed by an information processing apparatus according to an embodiment.
Figure 4:
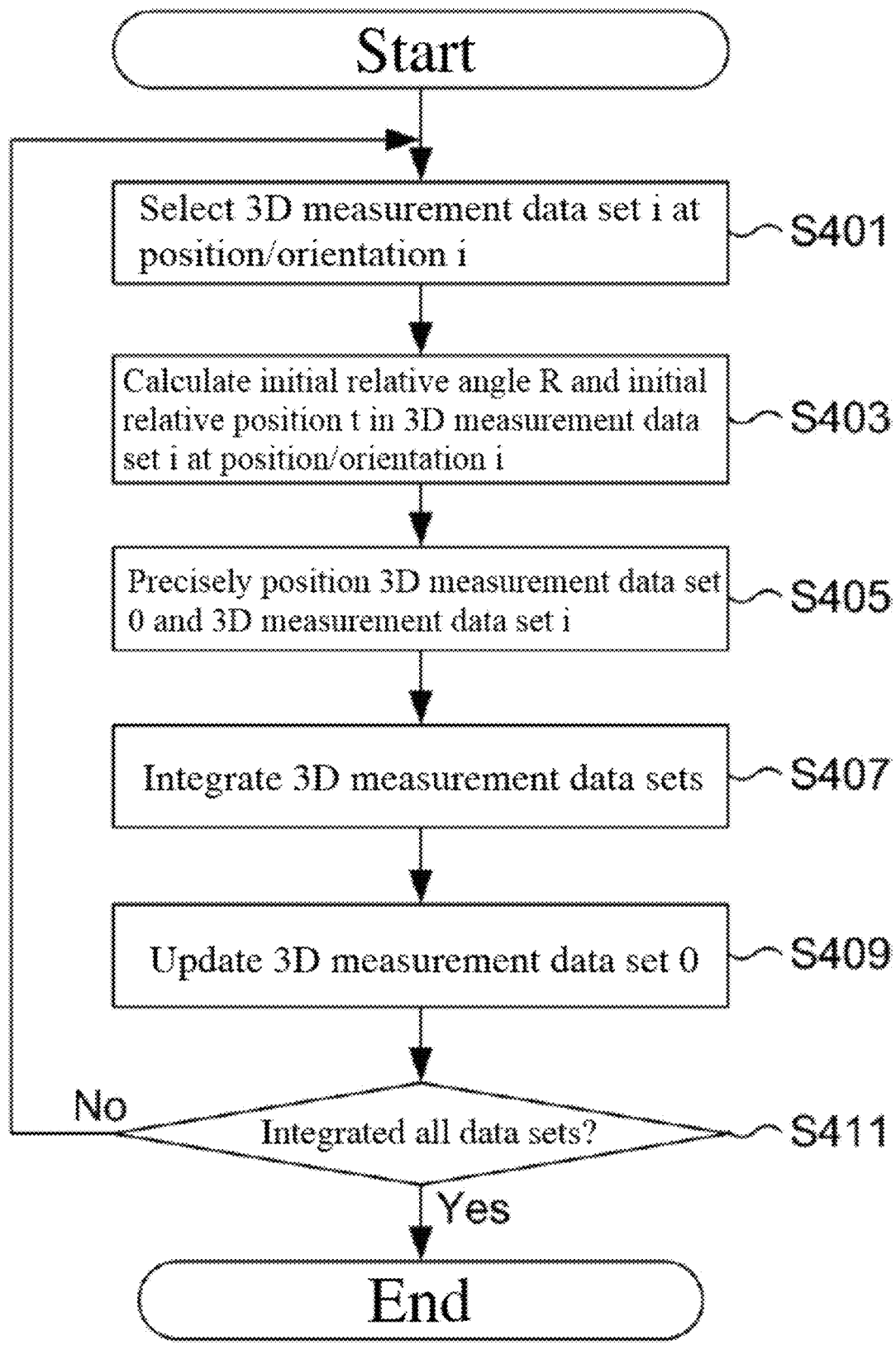
FIG. 4 is a flow diagram illustrating one example of a procedure performed by an information processing apparatus according to an embodiment.
Figure 5:
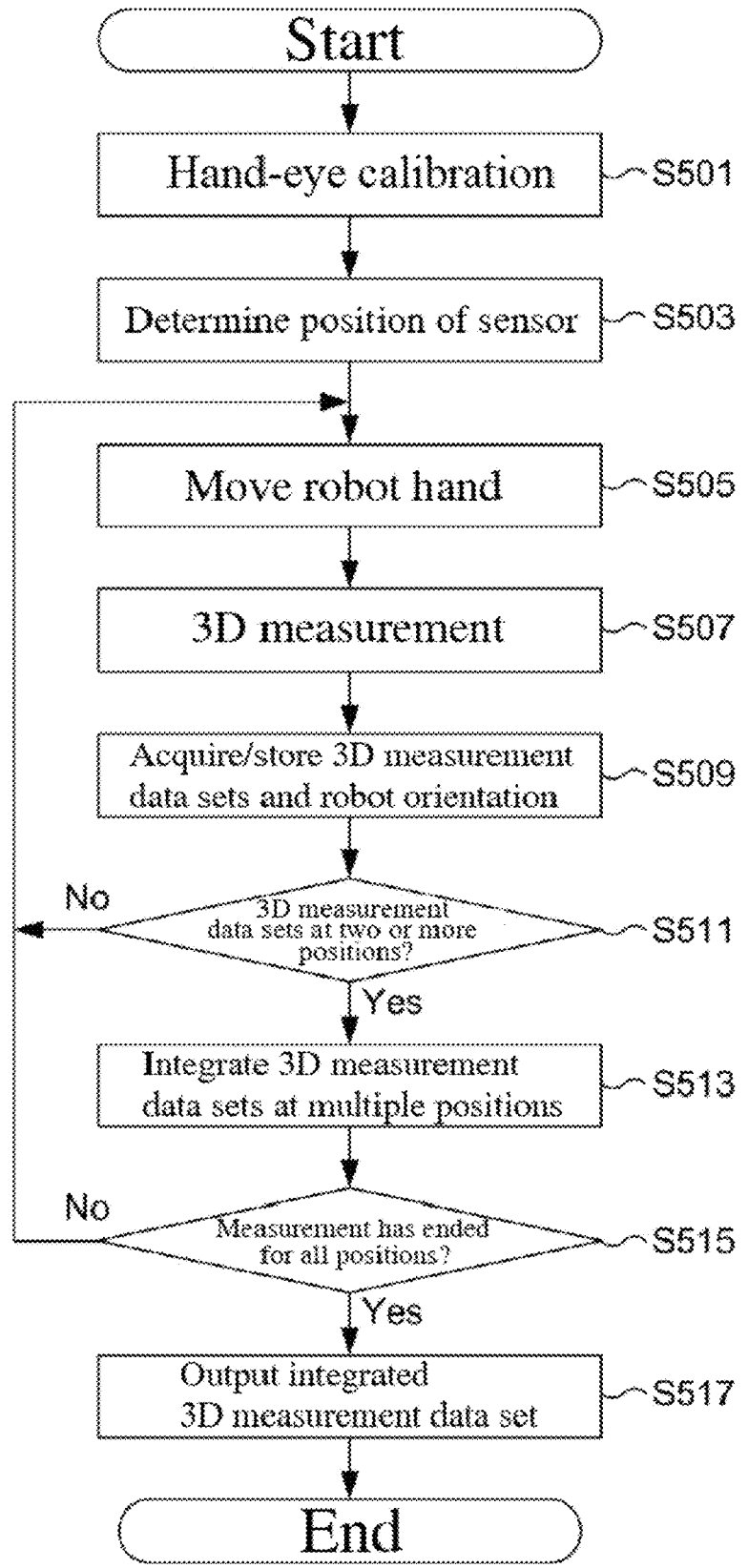
FIG. 5 is a flow diagram illustrating one example of a procedure performed by an information processing apparatus according to an embodiment.

The flow of processing performed by the information processing apparatus 100 will be described divided into two examples with reference to FIGS. 3 to 5. FIGS. 3 and 4 are flowcharts regarding Processing Example 1, and FIG. 5 is a flowchart regarding Processing Example 2, the flowcharts showing the flow of processing performed by the information processing apparatus 100.

Note that the order of processing steps, which will be described later, may also be suitably changed or the processing steps may also be executed in parallel, as long as no contradiction arises in the processing content. Also, other steps may be added between processing steps and executed. Furthermore, a step described as one step for convenience of the description may also be executed divided into a plurality of steps, and steps described as a plurality of steps for convenience of the description may also be executed as one step.

3.1 Processing Example 1

The flow of processing performed by the information processing apparatus 100 regarding Processing Example 1 will be described with reference to FIG. 3.

First, before the three-dimensional position is measured, the 3D measurement unit 103 performs hand-eye calibration on the 3D measurement sensor 13 for transformation of the coordinates of the 3D measurement data set 113 according to a measurement position (step S301). Note that hand-eye calibration is not necessarily performed each time of measurement, and it is sufficient to perform hand-eye calibration only once after the 3D measurement sensor 13 is attached.

The sensor position determination unit 105 determines a plurality of positions and orientations from which the 3D measurement sensor 13 makes three-dimensional position measurements (step S303).

The robot controller 101 controls the robot hand 11 of the industrial robot 10 such that the 3D measurement sensor 13 moves to the positions and orientations determined by the sensor position determination unit 105 (step S305).

When the 3D measurement sensor 13 moves to the position and the orientation determined by the sensor position determination unit 105, the 3D measurement unit 103 measures the three-dimensional position included in the measurement range (including the surface of the object O) (step S307).

The robot controller 101 and the 3D measurement unit 103 respectively acquire the robot orientation data 115 indicating the orientation and position of the robot hand 11 and the 3D measurement data sets 113 measured by the 3D measurement unit 103, and store them in the DB 111 (step S309).

The robot controller 101 and the 3D measurement unit 103 repeat the processing of steps S305 to S309 for all of the positions and orientations determined by the sensor position determination unit 105 (No in step S311).

When the processing for all of the positions and orientations ends (Yes in step S311), the 3D measurement data integration unit 107 performs processing for integrating the 3D measurement data sets 113 using the robot orientation data 115 (step S313).

The output unit 109 outputs the integrated 3D measurement data set 113 (step S315).

The flow of processing for integrating the 3D measurement data sets 113 will be described with reference to FIG. 4, the processing being shown in step S313 and performed by the 3D measurement data integration unit 107. Herein, it is presumed that a 3D measurement data set 113 for a position/orientation (position and orientation) 0 is integrated with a 3D measurement data set 113 for another position/orientation.

First, the 3D measurement data integration unit 107 selects a 3D measurement data set i from the 3D measurement data sets 113 stored in the DB 111 (step S401). Herein, "i" indicates a natural number.

Next, the 3D measurement data integration unit 107 calculates, using the robot orientation data 115, the relative rotation angle R and the relative position t of the 3D measurement sensor 13 located at the position/orientation i with respect to a position and a rotation angle of the 3D measurement sensor 13 at position/orientation 0. The relative rotation angle R and the relative position t at the position/orientation i can be calculated using the following equation.

$$_{cam\_0}\begin{bmatrix} R & t \\ 0 & 1 \end{bmatrix}_{cam\_i} = $$
$$_{tool}\begin{bmatrix} R & t \\ 0 & 1 \end{bmatrix}_{cam}^{-1} {}_{base}\begin{bmatrix} R & t \\ 0 & 1 \end{bmatrix}_{tool\_0}^{-1} {}_{base}\begin{bmatrix} R & t \\ 0 & 1 \end{bmatrix}_{tool\_i} {}_{tool}\begin{bmatrix} R & t \\ 0 & 1 \end{bmatrix}_{cam}$$

Formula 1

Here, $$_{cam\_0}\begin{bmatrix} R & t \\ 0 & 1 \end{bmatrix}_{cam\_i}$$

Formula 2

Formula 2 indicates relative rotation angle/relative position (relative rotation angle and relative position) t of the 3D measurement sensor 13 at the position/orientation i with respect to the position/orientation 0 of the 3D measurement sensor 13.

$$_{tool}\begin{bmatrix} R & t \\ 0 & 1 \end{bmatrix}_{cam}$$

Formula 3

Formula 3 indicates the relative rotation angle R and relative position t of the 3D measurement sensor 13 with respect to the robot hand 11 in the hand-eye calibration shown in step S301 shown in FIG. 3.

$$_{base}\begin{bmatrix} R & t \\ 0 & 1 \end{bmatrix}_{tool\_0}$$

Formula 4

Formula 4 indicates the relative rotation angle R and relative position t of the robot hand 11 at the position/orientation 0 with respect to the position at which the base of the industrial robot 10 is installed.

$$_{base}\begin{bmatrix} R & t \\ 0 & 1 \end{bmatrix}_{tool\_i}$$

Formula 5

Formula 5 indicates the relative rotation angle R and relative position t of the robot hand 11 at the position/orientation i with respect to the position at which the base of the industrial robot 10 is installed.

The 3D measurement data integration unit 107 precisely positions (aligns) the 3D measurement data set 0 and the 3D measurement data set i with respect to each other (step S405). Although various precise positioning (aligning) methods are possible, it is possible to perform positioning using ICP (Iterative Closest Point) based on the initial relative rotation angle R and the initial relative position t at the position/orientation i calculated in step S403, for example. Note that, if it seems that the robot hand 11 of the industrial robot 10 has a sufficiently high driving accuracy and the hand-eye calibration has a sufficiently high accuracy, then the precise positioning in step S405 may be omitted.

The relative rotation angles R and relative positions t with respect to the position/orientation 0 and the position/orientation i are obtained in this manner, their coordinate systems are aligned with each other, and the 3D measurement data integration unit 107 then performs processing for integrating the 3D measurement data set 0 and the 3D measurement data set i (step S407). As described above, various integration methods are possible. For example, with regard to a region whose three-dimensional position could not be measured from the first position/orientation and whose three-dimensional position could be measured from the second position/orientation, the 3D measurement data integration unit 107 may determine the three-dimensional position using the latter. Also, if the three-dimensional position could be measured from the first position/orientation and from the second position/orientation, it is possible to use the result of measurement of the three-dimensional position measured from position/orientation with the shorter straight distance. Also, at this time, the three-dimensional positions in an unmeasured region may be complemented with information regarding surrounding three-dimensional positions. This makes it possible to increase accuracy in measurement of three-dimensional positions.

When integration processing ends in this manner, the 3D measurement data integration unit 107 updates the 3D measurement data set 0 for the position/orientation 0, using the integrated 3D measurement data set (step S409).

Similarly, the 3D measurement data integration unit 107 performs processing for integrating the 3D measurement data sets 113 for all positions/orientations with the 3D measurement data set for the position/orientation 0 (No in step S411).

3.2 Processing Example 2

Next, Processing Example 2 related to generation of the 3D measurement data set 113 will be described with reference to FIG. 5. Although processing for integrating 3D measurement data sets, which are measurement results, is performed after the three-dimensional positions are measured from all of the measurement positions in Processing Example 1 described above, integration processing is successively performed on 3D measurement data sets 113 for which measurements is complete, in Processing Example 2. Performing 3D measurement processing (steps S505 to S509 shown in FIG. 5) and integration processing (step S513 shown in FIG. 5) in parallel to each other makes it possible to reduce the processing time.

The processing of steps S501 to S509 is similar to the processing of steps S301 to S309 in Processing Example 1 described with reference to FIG. 3, and thus will not be described.

When an unprocessed 3D measurement data set 113 is generated (Yes in step S511), the 3D measurement data integration unit 107 performs processing for integrating this unprocessed 3D measurement data set 113 with the 3D measurement data set 113 at the position/orientation 0 (step S513).

The processing for integrating the 3D measurement data sets 113 is similar to that of steps S403 to S409 described with reference to FIG. 4, and thus will not be described.

The robot controller 101, the 3D measurement unit 103, and the 3D measurement data integration unit 107 repeat the processing of steps S505 to S513 for all of the positions/orientations determined by the sensor position determination unit 105 (No in step S515).

When the processing for all of the positions/orientations determined by the sensor position determination unit 105 ends (Yes in step S515), the output unit 109 outputs the integrated 3D measurement data set 113 (step S517).

3.3 Modifications

Although processing is performed for all of the positions/orientations determined by the sensor position determination unit 105 in advance in Processing Examples 1 and 2 described with reference to FIGS. 3 to 5, an embodiment is not limited thereto. It is also possible that, for example, if the regions where measurements are possible in the integrated 3D measurement data set 113 have at least a certain density, or if object recognition is performed on the integrated 3D measurement data set 113 and the number of recognized objects reaches at least a certain number, processing ends.

4. Hardware Configuration

Figure 6:
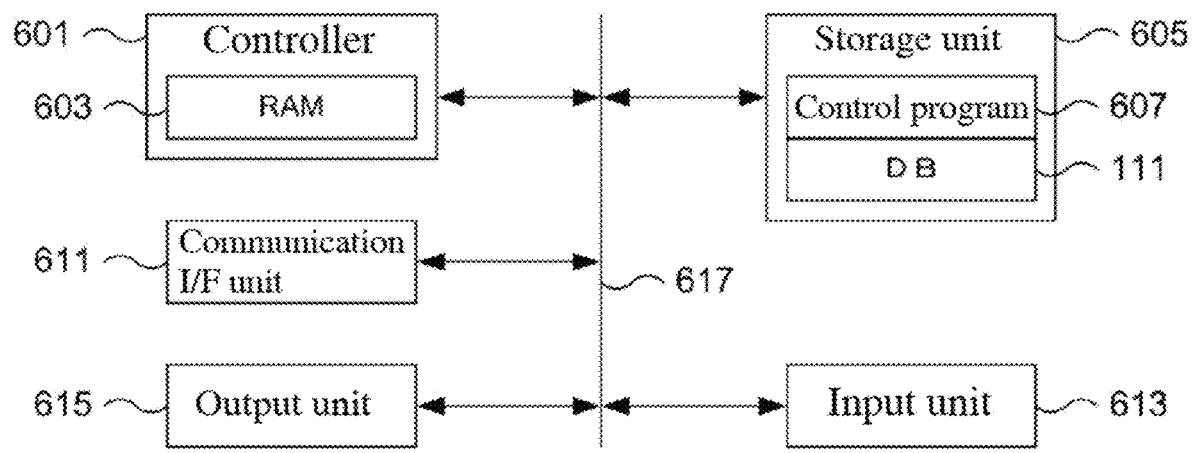
FIG. 6 is a schematic diagram illustrating one example of a hardware configuration of an information processing apparatus according to an embodiment.

A hardware configuration that is capable of realizing the information processing apparatus 100 will be described with reference to FIG. 6. FIG. 6 schematically shows one example of the hardware configuration of the information processing apparatus 100 according to an embodiment.

The information processing apparatus 100 shown in the example shown in FIG. 6 includes a controller 601, a storage unit 605, a communication interface (I/F) unit 611, an input unit 613, and an output unit 615, and these units may be selected to be capable of mutual communication via a bus line 617.

The controller 601 include a CPU (Central Processing Unit), a RAM (Random Access Memory) 603, and a ROM (Read Only Memory), for example, and controls constituent elements according to information processing. More specifically, for example, the CPU that may be included in the controller 601 can execute the above-described various processes related to the robot controller 101, the 3D measurement unit 103, the sensor position determination unit 105, the 3D measurement data integration unit 107, and the output unit 109 that are shown in FIG. 2 by loading a control program 607 from the storage unit 605 into the RAM 603 and executing this control program 607.

The storage unit 605 is an auxiliary storage such as a hard disk drive (HDD) or a solid-state drive (SSD), and stores the control program 607 executed by the controller 601 and the database (DB) 111, for example. As described above, the 3D measurement data sets 113, the robot orientation data 115, and the like can be managed in the DB 111.

The control program 607 is a program for causing the information processing apparatus 100 to execute processing described with reference to FIGS. 1 to 5. In particular, configurations of the robot controller 101, the 3D measurement unit 103, the sensor position determination unit 105, the 3D measurement data integration unit 107, and the output unit 109 that are shown in FIG. 2 may be realized as the control program 607.

The communication I/F unit 611 is a communication module for wired or wireless communication with another apparatus such as the industrial robot 10, for example. The communication I/F unit 611 may use any communication method for communicating with the other apparatus, and examples of the communication method include a LAN (Local Area Network) and a USB (Universal Serial Bus). It is possible that controls signals are transmitted to and received from the robot hand 11 and the 3D measurement sensor 13 of the industrial robot 10 via the communication I/F unit 611, for example.

The input unit 613 is a device for accepting various operations input by a user, the input unit 613 being realized by a mouse, a keyboard, or a touch panel, for example. The output unit 615 is an apparatus (e.g., a display or a speaker) for notifying a user who utilizes the information processing apparatus 100 of various types of information using display or sound. It is possible that as a result of the output unit 109 displaying, on a display apparatus, the integrated 3D measurement data set 113 integrated by the 3D measurement data integration unit 107, the 3D measurement data set 113 is presented to the user, for example.

5. Effects of Embodiment

As described above, in the 3D position detection system 1 according to an embodiment, as a result of freely changing the position of the 3D measurement sensor 13 using the robot hand 11 provided with the 3D measurement sensor 13, the 3D measurement data sets 113 for the three-dimensional positions of the object O are generated from a plurality of positions and orientations. As a result of the 3D measurement data integration unit 107 integrating these generated data sets, a 3D measurement data set 113 with few missing regions (unmeasured regions) can be generated by applying the three-dimensional positions measured from other positions/orientations to a region whose three-dimensional position could not be measured from a given position/orientation.

Also, integrating the 3D measurement data sets 113 measured from a plurality of positions/orientations makes it possible to make measurement accuracy higher than that with a 3D measurement data set 113 measured only from one position/orientation.

6. Additional Remarks

The above-described embodiment is for facilitating understanding of the present invention and is not intended to limit the interpretation of the present invention. Elements included in an embodiment and their arrangement, materials, conditions, shapes, size, and the like are not limited to the examples and can be changed as appropriate. Also, it is possible to partially replace or combine configurations described in different embodiments.

Additional Remark 1

An information processing apparatus (100) including:
a determination unit (105) configured to determine a plurality of measurement positions and/or orientations from which a 3D measurement sensor (13) makes three-dimensional measurements;
a controller (101) configured to successively move the 3D measurement sensor (13) to the plurality of measurement positions and/or orientations;
a measurement unit (103) configured to generate a plurality of 3D measurement data sets (113) through three-dimensional measurement using the 3D measurement sensor (13) at each of the plurality of measurement positions; and
a data integration unit (107) configured to integrate the plurality of 3D measurement data sets.

Additional Remark 2

The information processing apparatus (100) according to Additional Remark 1,
in which, if a three-dimensional measurement is possible from a second measurement position and/or orientation that is different from a first measurement position and/or orientation out of the plurality of measurement positions and/or orientations, for a missing region where three-dimensional measurement is not possible from the first measurement position and/or orientation—then the data integration unit (107) applies the 3D measurement data set measured from the second measurement position and/or orientation to the missing region.

Additional Remark 3

The information processing apparatus (100) according to Additional Remark 2,
in which the data integration unit (107) applies a measurement result obtained from the measurement position and/or orientation having a shorter distance from a measurement object to a region where a three-dimensional measurement is possible from the first measurement position and/or orientation and the second measurement position and/or orientation.

Additional Remark 4

The information processing apparatus (100) according to any one of Additional Remarks 1 to 3,
in which integration of the plurality of 3D measurement data sets (113) by the data integration unit (107) and movement of the 3D measurement sensor (13) by the controller (101) are performed in parallel to each other.

Additional Remark 5

The information processing apparatus (100) according to any one of Additional Remarks 1 to 4,
in which the controller (101) moves the 3D measurement sensor (13) using a robot hand (11) of a robot (10).

Additional Remark 6

The information processing apparatus (100) according to Additional Remark 5,
in which the controller (101) performs hand-eye calibration on the 3D measurement sensor (13) attached to the robot hand (11).

Additional Remark 7

The information processing apparatus (100) according to any one of Additional Remarks 1 to 6,
in which the data integration unit (107) converts the plurality of 3D measurement data sets (113) such that the plurality of 3D measurement data sets (113) have the same coordinate system by calculating relative positions and relative rotation angles between the plurality of measurement positions and/or orientations, and integrates the plurality of converted 3D measurement data sets (113).

Additional Remark 8

An information processing method,
in which an information processing apparatus (100) performs processing for determining a plurality of measurement positions and/or orientations from which a 3D measurement sensor (13) makes three-dimensional measurements;
processing for successively moving the 3D measurement sensor (13) to the plurality of measurement positions;
processing for generating a plurality of 3D measurement data sets (113) through three-dimensional measurement using the 3D measurement sensor (13) at each of the plurality of measurement positions and/or orientations; and
processing for integrating the plurality of 3D measurement data sets (113).

Additional Remark 9

A program (907) for causing an information processing apparatus (100) to execute:
processing for determining a plurality of measurement positions and/or orientations from which a 3D measurement sensor (13) makes three-dimensional measurements;
processing for successively moving the 3D measurement sensor (13) to the plurality of measurement positions and/or orientations;
processing for generating a plurality of 3D measurement data sets (113) through three-dimensional measurement using the 3D measurement sensor (13) at each of the plurality of measurement positions and/or orientations; and
processing for integrating the plurality of 3D measurement data sets (113).

LIST OF REFERENCE NUMERALS 1 3D position detection system
10 Industrial robot
11 Robot hand
13 3D measurement sensor
100 Information processing apparatus
101 Robot controller
103 3D measurement unit
105 Sensor position determination unit
107 3D measurement data integration unit
109 Output unit
111 Database (DB)
113 3D measurement data set
115 Robot orientation data
601 Controller
603 RAM
605 Storage unit
607 Control program
611 Communication interface (I/F) unit
613 Input unit
615 Output unit
617 Bus line

The invention claimed is:

1. An information processing apparatus comprising:
a processor configured with a program to perform operations comprising:
operation as a determination unit configured to determine a plurality of measurement positions or orientations from which a 3D measurement sensor makes three-dimensional measurements, each measurement comprising a distance from the 3D measurement sensor to a three-dimensional position on a surface of a measurement object, the three-dimensional measurements from each respective measurement position of the plurality of measurement positions, to be made in a region on the surface of the measurement object;

operation as a controller configured to successively move the 3D measurement sensor to the plurality of measurement positions or orientations;

operation as a measurement unit configured to generate a plurality of 3D measurement data sets comprising the three-dimensional measurements, through three-dimensional measurement using the 3D measurement sensor at each of the plurality of measurement positions or orientations; and operation as a data integration unit configured to integrate the plurality of 3D measurement data sets, such that, in response to the plurality of measurement data sets including different distance measurements from different measurement positions for the same three dimensional position in the region of the surface of the measurement object, a shortest distance of the different distance measurements is applied to the integration as the measurement distance for the three dimensional position in the region.

2. The information processing apparatus according to claim 1, wherein the processor is configured with the program to perform operations such that, in response to a three-dimensional measurement being possible from a second measurement position or orientation that is different from a first measurement position or orientation out of the plurality of measurement positions or orientations to the surface of the measurement object, for a missing region where three-dimensional measurement is not possible from the first measurement position or orientation to the surface of the measurement object, operation as the data integration unit further comprises applying the 3D measurement data set measured from the second measurement position or orientation to the missing region.

3. The information processing apparatus according to claim 2, wherein the processor is configured with the program to perform operations such that operation as the data integration unit further comprises applying a measurement result obtained from one of the first measurement position or orientation and the second measurement position or orientation having a shorter distance from the measurement object to the region where the three-dimensional measurement is possible from the first measurement position or orientation and the second measurement position or orientation.

4. The information processing apparatus according to claim 1, wherein the processor is configured with the program to perform operations such that integration of the plurality of 3D measurement data sets by the data integration unit and movement of the 3D measurement sensor by the controller are performed in parallel with each other.

5. The information processing apparatus according to claim 1, wherein the processor is configured with the program to perform operations such that operation as the controller further comprises moving the 3D measurement sensor using a robot hand of a robot.

6. The information processing apparatus according to claim 5, wherein the processor is configured with the program to perform operations such that operation as the controller further comprises performing hand-eye calibration on the 3D measurement sensor attached to the robot hand.

7. The information processing apparatus according to claim 1, wherein the processor is configured with the program to perform operations such that operation as the data integration unit further comprises converting the plurality of 3D measurement data sets such that the plurality of 3D measurement data sets have the same coordinate system by calculating relative positions and relative rotation angles between the plurality of measurement positions or orientations, and integrates the plurality of converted 3D measurement data sets.

8. The information processing apparatus according to claim 2, wherein the processor is configured with the program to perform operations such that integration of the plurality of 3D measurement data sets by the data integration unit and movement of the 3D measurement sensor by the controller are performed in parallel with each other.

9. The information processing apparatus according to claim 3, wherein the processor is configured with the program to perform operations such that integration of the plurality of 3D measurement data sets by the data integration unit and movement of the 3D measurement sensor by the controller are performed in parallel with each other.

10. The information processing apparatus according to claim 2, wherein the processor is configured with the program to perform operations such that operation as the controller further comprises moving the 3D measurement sensor using a robot hand of a robot.

11. The information processing apparatus according to claim 10, wherein the processor is configured with the program to perform operations such that operation as the controller further comprises performing hand-eye calibration on the 3D measurement sensor attached to the robot hand.

12. The information processing apparatus according to claim 3, wherein the processor is configured with the program to perform operations such that operation as the controller further comprises moving the 3D measurement sensor using a robot hand of a robot.

13. The information processing apparatus according to claim 12, wherein the processor is configured with the program to perform operations such that operation as the controller is further configured to perform hand-eye calibration on the 3D measurement sensor attached to the robot hand.

14. The information processing apparatus according to claim 4, wherein the processor is configured with the program to perform operations such that operation as the controller further comprises moving the 3D measurement sensor using a robot hand of a robot.

15. The information processing apparatus according to claim 14, wherein the processor is configured with the program to perform operations such that operation as the controller further comprises performing hand-eye calibration on the 3D measurement sensor attached to the robot hand.

16. The information processing apparatus according to claim 2, wherein the processor is configured with the program to perform operations such that operation as the data integration unit further comprises converting the plurality of 3D measurement data sets such that the plurality of 3D measurement data sets have the same coordinate system by calculating relative positions and relative rotation angles between the plurality of measurement positions or orientations, and integrates the plurality of converted 3D measurement data sets.

17. The information processing apparatus according to claim 3, wherein the processor is configured with the program to perform operations such that operation as the data integration unit further comprises converting the plurality of 3D measurement data sets such that the plurality of 3D measurement data sets have the same coordinate system by calculating relative positions and relative rotation angles between the plurality of measurement positions or orientations, and integrates the plurality of converted 3D measurement data sets.

18. The information processing apparatus according to claim 4, wherein the processor is configured with the program to perform operations such that operation as the data integration unit further comprises converting the plurality of 3D measurement data sets such that the plurality of 3D measurement data sets have the same coordinate system by calculating relative positions and relative rotation angles between the plurality of measurement positions or orientations, and integrates the plurality of converted 3D measurement data sets.

19. An information processing method performed by an information processing apparatus, the method comprising:
   determining a plurality of measurement positions or orientations from which a 3D measurement sensor makes three-dimensional measurements, each measurement comprising a distance from the 3D measurement sensor to a three-dimensional position on a surface of a measurement object, the three-dimensional measurements from each respective measurement position of the plurality of measurement positions, to be made in a region on the surface of the measurement object;
   moving successively the 3D measurement sensor to the plurality of measurement positions or orientations;
   generating a plurality of 3D measurement data sets through three-dimensional measurement using the 3D measurement sensor at each of the plurality of measurement positions or orientations; and
   integrating the plurality of 3D measurement data sets, such that, in response to the plurality of measurement data sets including different distance measurements from different measurement positions for the same three dimensional position in the region of the surface of the measurement object, a shortest distance of the different distance measurements is applied to the integration as the measurement distance for the three dimensional position in the region.

20. A non-transitory computer-readable storage medium storing a program, which when read and executed, causes an information processing apparatus to perform operations comprising:
   determining a plurality of measurement positions or orientations from which a 3D measurement sensor makes three-dimensional measurements, each measurement comprising a distance from the 3D measurement sensor to a three-dimensional position on a surface of a measurement object, the three-dimensional measurements from each respective measurement position of the plurality of measurement positions, to be made in a region on the surface of the measurement object,
   moving successively the 3D measurement sensor to the plurality of measurement positions or orientations,
   generating a plurality of 3D measurement data sets through three-dimensional measurement using the 3D measurement sensor at each of the plurality of measurement positions or orientations; and
   integrating the plurality of 3D measurement data sets, such that, in response to the plurality of measurement data sets including different distance measurements from different measurement positions for the same three dimensional position in the region of the surface of the measurement object, a shortest distance of the different distance measurements is applied to the integration as the measurement distance for the three dimensional position in the region.

* * * * *